(12) United States Patent
Laurent et al.

(10) Patent No.: US 6,464,275 B2
(45) Date of Patent: Oct. 15, 2002

(54) VEHICLE EMBODYING A SYSTEM FOR PROTECTION IN CASE OF IMPACT

(75) Inventors: Daniel Laurent; Marc Sebe, both of Marly (CH)

(73) Assignee: Conception et Developpement Michelin S.A. (CH)

( * ) Notice: Subject to any disclaimer, the term of this patent is extended or adjusted under 35 U.S.C. 154(b) by 0 days.

(21) Appl. No.: 09/791,191

(22) Filed: Feb. 23, 2001

(65) Prior Publication Data

US 2001/0026079 A1 Oct. 4, 2001

(30) Foreign Application Priority Data

Feb. 23, 2000 (FR) .............................. 00 02283

(51) Int. Cl.[7] .............................................. B62D 21/15
(52) U.S. Cl. ...................................... 296/35.2; 180/274
(58) Field of Search ............................... 296/35.2, 35.1, 296/189; 180/271, 274, 232; 280/784

(56) References Cited

U.S. PATENT DOCUMENTS

| 3,162,479 A | * | 12/1964 | Hewitt |
| 3,508,783 A | * | 4/1970 | Schlanger |
| 3,589,466 A | * | 6/1971 | Dudley |
| 3,695,629 A | * | 10/1972 | Schlanger |
| 3,743,347 A | * | 7/1973 | Shaw |
| 3,831,998 A | * | 8/1974 | Hewitt |
| 3,837,422 A | * | 9/1974 | Schlanger |
| 5,251,911 A | * | 10/1993 | Blak |
| 5,409,262 A | | 4/1995 | McLennan ............... 280/784 |
| 5,738,378 A | * | 4/1998 | Yazrjian ............. 296/35.2 X |

FOREIGN PATENT DOCUMENTS

| DE | 19817992 | | 12/1999 |
| DE | 19909432 | | 9/2000 |
| EP | 0878378 | * | 11/1998 |
| GB | 1042390 | | 9/1966 |
| GB | 1531021 | | 6/1976 |

* cited by examiner

*Primary Examiner*—Joseph D. Pape
(74) *Attorney, Agent, or Firm*—Baker Botts LLP

(57) ABSTRACT

The vehicle having a chassis extending towards the front end of the vehicle where it has an impact zone and a cabin for the transport of passengers. The vehicle embodies a mechanical device for raising at least the front of the cabin relative to the chassis while the cabin moves forwards relative to the chassis in the event of an impact, the mechanical device including at least one rocker articulated to the chassis on the one hand, and articulated to the cabin on the other hand.

14 Claims, 2 Drawing Sheets

VEHICLE EMBODYING A SYSTEM FOR PROTECTION IN CASE OF IMPACT

BACKGROUND OF THE INVENTION

The present invention relates to vehicles, particularly road vehicles. More precisely, it relates to the passive safety of such vehicles.

Road vehicles, particularly passenger cars, are at present designed with great attention to safety. It is usual to distinguish between active and passive safety. Active safety is a vehicle's ability to avoid accidents, while passive safety is its ability to protect its occupants effectively when an accident could not be avoided. Under the latter category are included safety belts, airbags which are inflated in the event of impact, and also the vehicle's capacity, by its own crushing, to absorb part of the kinetic energy to be dissipated in the event of an impact, while preserving for the occupants a survival cell which is deformed as little as possible.

It is now known to design bodies for passenger cars which have a cabin usually described as undeformable, protected at least at the front of the vehicle by a part that deforms plastically to absorb part of the vehicle's kinetic energy at the moment of impact, and also to reduce the deceleration to which the passengers are subjected. It is important to limit the value of this deceleration as much as possible, to reduce the risk of injury to the passengers or minimize the severity of injuries. Besides, the aim is to prevent penetration into the cabin of any mechanical element, such as the engine and steering mechanism and control rods connected to the pedal mechanisms. This has sometimes led to designs in which the implantation of the mechanical elements combined with the shape of the bulkhead separating the engine compartment from the cabin cause the engine to slide under the cabin in the event of impact.

SUMMARY OF THE INVENTION

The aim of the present invention is to improve the protection of a vehicle's occupants still more in the event of a frontal collision.

The invention proposes a vehicle having a preferential rolling direction over the ground and comprising:
- at the front, a chassis that extends towards the front end of the vehicle where it comprises an impact zone;
- a cabin for transporting passengers, the said cabin being self-supporting and having a front edge, with said impact zone being remote from said front edge of the cabin;
- a connection element forming a connecting bar, one end of which is articulated to the chassis at a chassis connection zone and the other end of which is articulated to the cabin at a cabin connection zone, the cabin connection zone being positioned at a level higher than the chassis connection zone, and the cabin connection zone being positioned behind the chassis connection zone.

Most of the heavy motorization systems of the vehicle are preferably attached to the chassis. The notion of a preferential rolling direction makes it possible to identify clearly on the vehicle a front and a rear. It therefore also allows zones on the vehicle to be referred to as further or less far back or further or less far forward. It also permits reference, along a vertical direction, to different levels which are higher or less high relative to the ground.

According to the current usage of the term, a chassis is a structure carrying the mechanical elements on the one hand and the cabin on the other hand, and which is the first-order determinant of the structural rigidity of the vehicle, particularly its torsional rigidity. This design technique has been and is still used for numerous 4×4 vehicles. It is known that the self-supporting body technique has led to the suppression of chassis in virtually all touring vehicles produced nowadays. For all that, however, mechanical elements, such as engines, gear-boxes and ground contact elements are not always mounted individually on the body. There exist what are known as cradles or false chassis, which constitute a structure on which a group of mechanical elements is mounted, the cradle itself then being mounted on the body. In this case the cradle is not required to contribute to the rigidity of the body, its main functions being to facilitate vehicle assembly and to contribute towards better isolation of the vibrations.

The vehicle according to the invention has in part the structure of vehicles with a separate chassis, although the presence of a cabin designed to constitute a survival cell for the passengers is only one important aspect of the invention. The mechanical elements are arranged such that their mass does not compromise the protection of the passengers. This explains the recourse to a supporting and working structure separate from the cabin, which both resembles a chassis because the said structure has an inherent rigidity comparable to that expected in classical vehicles, and also resembles the cradle technique in that it does not necessarily extend the full length of the vehicle, and because it is not intended to confer on the cabin the inherent rigidity expected with cabins of the type known as "undeformable". The word "chassis" should be understood in this sense in the present invention.

The invention will be better understood from the description below, which concerns a passenger car with four wheels, although the example given is not limiting.

DESCRIPTION OF PREFERRED EMBODIMENTS

Figure 1:
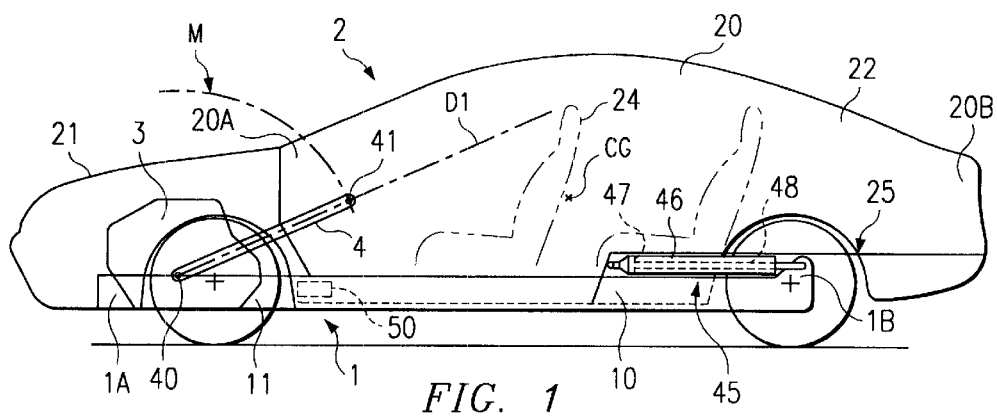
FIG. 1 shows a schematic illustration of a vehicle according to the invention.

FIG. 1 shows a vehicle comprising a chassis 1 with a central strut 10. The vehicle comprises a body 2 forming a cabin 20 for the transport of passengers, a front compartment 21 covering the mechanical elements and a rear compartment, 22 for luggage. The cabin 20 has seats 24 for passengers. The cabin may be provided with any appropriate elements that contribute to passenger protection, such as safety belts and/or airbags. The cabin forms a survival cell which corresponds essentially to the passenger compartment.

At the front of the vehicle the chassis 1 comprises a closed frame 11 connected towards the rear of the vehicle to the central strut 10. The essential mechanical components are accommodated within the frame 11. In particular, an engine 3 can be seen. It is of little importance which motorization system is used (classical thermal engine, electric motor, with transmission to the drive wheels by mechanical shafts, or with electrical transmission), but it is advantageous to attach to the chassis most of the heavy elements of the vehicle's motorization system, which correspondingly makes the cabin lighter.

At the front, the chassis ends in an impact zone 1A. In the event of a frontal impact it is on this zone that forces are initially exerted. The impact zone may comprise a portion which deforms progressively, or it may be preceded at the front by part of the bodywork that deforms progressively and is preferably designed to absorb shocks up to medium intensity. In other words, the mechanical device designed to raise the cabin does not come into action until a collision with a certain minimum degree of severity.

Between the impact zone 1A and the front limit 20A of the cabin 20 there is a certain protection, in other words a certain distance, of which advantage is taken to enable a displacement of the cabin towards the front. This relative movement between the chassis and cabin enables the cabin to be subjected to a deceleration much smaller than that of the chassis. This is the role of the mechanical device for raising at least the front of the cabin relative to the chassis.

Figure 2:
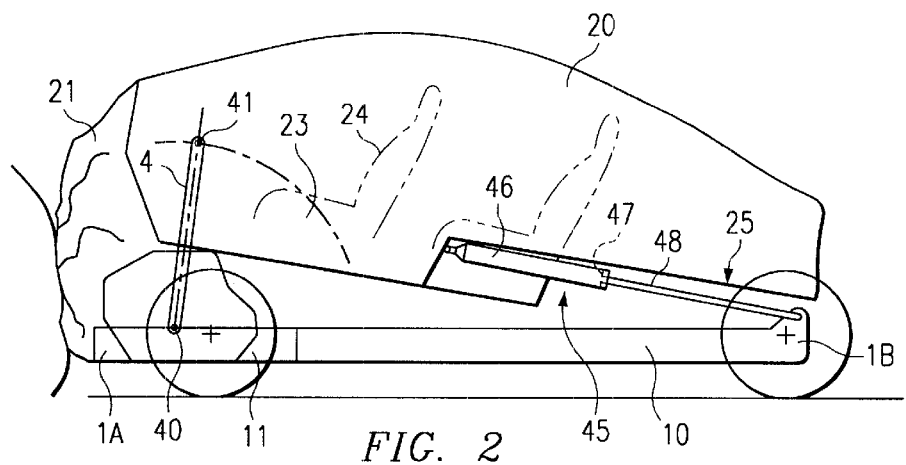
FIG. 2 shows a schematic illustration of the same vehicle after a frontal impact.

FIGS. 1 and 2 show a lever 4 which forms a kind of rocker. This is the connecting element in the present example. In practice there are preferably at least two levers mounted to form a triangulation in a transverse plane, so that the cabin cannot move laterally relative to the chassis. The lever 4 rests on the chassis at a first level that can be identified in FIGS. 1 and 2 by the articulation axis 40. This articulation 40 is mounted on the chassis 1 so that its geometrical axis is essentially horizontal and perpendicular to the preferential rolling direction. It may be a true articulation, or any technical solution with equivalent effect that produces a pseudo-articulation. This may be a local thinning of the material in a continuous structural component that forms both the chassis and the lever.

The function of the connecting element is to raise at least the front of the cabin relative to the chassis, while the cabin can move forwards relative to the chassis in the event of an impact. The connecting element acts as a connecting bar; this means that when viewed in a longitudinal plane such as the plane of FIG. 1, there is no other bar in the connection of the cabin to the chassis at the front of the cabin.

The essential feature, then, is to ensure the function of raising the cabin due to its inertia during a frontal impact, by any appropriate means. To that end, the rocker receives the cabin 20 at a second level higher than the first level, the cabin reception zone being located further back relative to the zone of contact with the chassis. This second level can be identified in FIGS. 1 and 2 as the articulation 41. What was said earlier about the articulation 40 also applies to the articulation 41.

The geometrical axis of the said articulation(s) is advantageously a single axis. Preferably, in order to facilitate the raising of the cabin, considering the projection of the point representing the articulation to the cabin (namely 41) and that of the point representing the articulation to the chassis (namely 40) in the plane of symmetry of the vehicle, the line $D_1$ connecting the said representative points passes above the center of gravity CG of the cabin (see FIG. 1). As a variant or supplement, the raising of the cabin can also be made easier by using a pyrotechnic charge and shock detection means to trigger its ignition, the said pyrotechnic charge assisting the raising of the cabin relative to the chassis, for example by exerting a vertical force under the rocker(s). The pyrotechnic charge and shock detection means are indicated schematically at 50 in FIG. 1.

A comparison of FIGS. 1 and 2 makes clear how the rising movement of the front of the cabin 20 has been organized, by causing the articulation 41 to pivot around the articulation 40 as shown by the line M.

In a variant embodiment very appropriate for the case of a chassis with a central strut 10, the connecting element forms a rocker consisting essentially of a component 4B (see FIGS. 3 to 6) mounted astride and above the central strut and articulated to the central strut and on either side thereof by an articulation 40B whose geometrical ax is is essentially horizontal and perpendicular to the preferential rolling direction.

Figure 3:
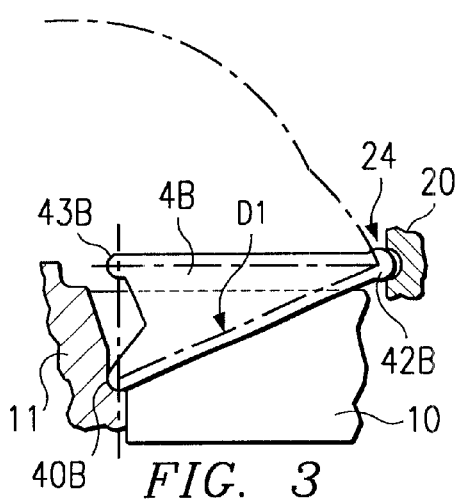
FIG. 3 shows a variant embodiment of an element according to the invention, in the rest position.

The variant embodiment illustrated in FIG. 3 and those after it shows another advantageous but not limiting design detail, intended to avoid the transmission of vibrations to the cabin. FIG. 3 shows that the connecting element is not in contact with the cabin 20, but is ready to receive it in the event of an impact where the rockers serving as the connecting element terminate on the cabin side at an end-stop 42B mounted opposite a bearing surface 24 located a short distance behind the end-stop. Thus, there is a slight clearance between the rocker and the cabin. Besides, the cabin is mounted ion the chassis by connections that allow a relative movement between the chassis and the cabin parallel to the preferential rolling direction in the event of an impact, for example by virtue of connections comprising rubber between two armatures. The deformation of the rubber easily permits the appropriate relative displacements between the chassis and the cabin. The bearing surface 24 allows the thrust exerted by the body in an impact tb be transmitted to the end-stop.

Figure 4:
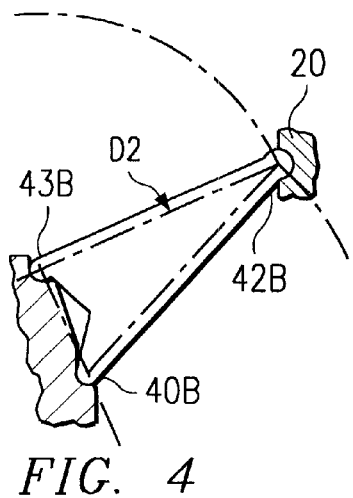
FIG. 4 shows the same element in operation during an impact.
Figure 5:
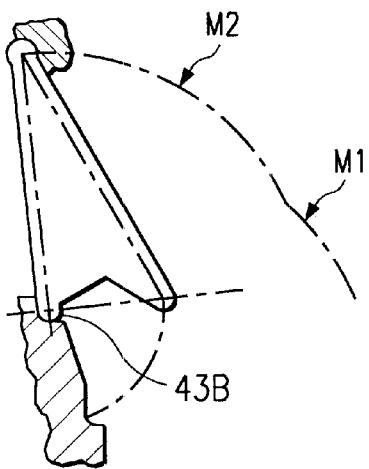
FIG. 5 shows the same element after an impact.
Figure 6:
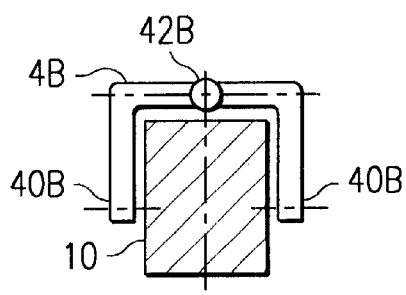
FIG. 6 is an end view of the same element, in the rest position.

The design of the rocker 4B also comprises a variant on the side of the articulation of the rocker to the chassis 1. It can be seen that the articulation is divided into a first articulation 40B and then a second articulation 43B. The said articulations, 40B and 43B on the one hand, and the end-stop 42B forming the cabin side articulation on the other hand, are positioned so that in the rest position shown in FIG. 3 the line $D_1$ connecting the first articulation 40B to the end-stop 42B passes above the cabin's center of gravity, and during tilting, when the second articulation 43B is in contact with the chassis 1 as shown in FIG. 4, the line $D_2$ connecting the second articulation 43B to the end-stop 42B passes above the cabin's center of gravity. This makes it possible to raise the cabin higher without compromising the initiation of the raising movement, by causing the articulation on the cabin side to describe two successive circular arcs $M_1$ and $M_2$.

It is also preferable to guide the rear of the cabin relative to the chass is. Returning to FIGS. 1 and 2, a particular but not limiting guide system for this can be seen. The chassis 1 extends towards the rear of the vehicle and the rear portion of the cabin, and more precisely in this case its extension constituted by the luggage compartment, is mounted on the chassis by an element forming a slide 25 orientated in the rolling direction. As a result, the cabin is made to tilt as it is rising. Consequently the base of the seatings 24 assists in retaining the passengers.

There is also a damper 45, which is activated by the relative movement between the cabin 20 and the chassis 1. Although part of the energy is dissipated by raising a load during the impact, the dissipation can be increased by fitting a damper for this. The damper 45 comprises a tubular reservoir 46 filled with a viscous fluid in which a partition wall 47 having at least one calibrated orifice can move, such that damping results from the throttling effect when the viscous fluid is forced to flow from one side of the partition to the other, the partition being drawn within the reservoir by a cable 48, the cable and the reservoir being attached one to the cabin and the other to the chassis. In the embodiment proposed, it is the cable that is connected to the rear end 1B of the chassis 1. It should be noted that the overhang beyond the chassis formed by the luggage compartment 22 forming part of the cabin also allows the cabin to rise in the event of a rear impact. It is therefore advantageous for the cabin 20 to have a rear edge 20B located further back than the rear end 1B of the chassis 1.

It should also be noted that the invention allows the cabin 20 to be mounted on the chassis 1 so as to tilt about a longitudinal axis lying in the vehicle's plane of symmetry. In this respect reference should be made to Patent Application EP 0 878 378. There, it can be seen that the cabin is mounted on a chassis so that it can form a variable rolling angle, means of control being interposed between the chassis and the cabin. The said rolling angle can then be positively controlled. This arrangement can be combined with the present invention by positioning the connection zone to the cabin essentially on the longitudinal axis about which the cabin can be tilted.

On the basis of what has just been explained, those familiar with the field will be able to make adaptations according to their own wishes without going beyond the scope of the present invention. For example, the rear of the cabin could be raised higher by the judicious positioning of one or more other rockers. If it is desired to avoid any permanent contact of the rocker(s) to avoid the transmission of vibrations, it would of course be possible to leave clearance between the chassis and the rocker(s) rather than between the cabin and the rocker(s).

We claim:

1. A vehicle having a preferential rolling direction over the ground and comprising:
   at the front, a chassis extending towards the front end of the vehicle where it comprises an impact zone;
   a cabin for the transport of passengers, the cabin being self-supporting and having a front edge, with said impact zone being remote from said front edge of the cabin; and
   a connection element forming a connecting bar articulated at one end to the chassis at a first point in a chassis connection zone and at the other end to the cabin at a second point in a cabin connection zone, the cabin connection zone being positioned at a level higher than and behind the chassis connection zone such that a straight-line projected through said first and second points of articulation passes above the center of gravity of the cabin.

2. A vehicle according to claim 1, in which the connecting element is mounted on the chassis by an articulation whose geometrical axis is essentially horizontal and perpendicular to the rolling direction.

3. A vehicle having a preferential rolling direction over the ground and comprising:
   at the front, a chassis comprising a central strut extending towards the front end of the vehicle where it comprises an impact zone;
   a cabin for the transport of passengers, the cabin being self-supporting and having a front edge, with said impact zone being remote from said front edge of the cabin;
   at least one connection element forming a connecting bar articulated at one end to the chassis at a chassis connection zone and at the other end to the cabin at a cabin connection zone, the cabin connection zone being positioned at a level higher than and behind the chassis connection zone; and
   said at least one connecting element forming a rocker essentially comprising a component mounted astride the central strut and mounted on the central strut and either side of said strut by an articulation whose geometrical axis is essentially horizontal and perpendicular to the preferential rolling direction.

4. A vehicle having a preferential rolling direction over the ground and comprising:
   at the front, a chassis comprising a central strut extending towards the front end of the vehicle where it comprises an impact zone;
   a cabin for the transport of passengers, the cabin being self-supporting and having a front edge, with a certain protection formed between said impact zone and said front edge of the cabin;
   a connection element forming a connecting bar articulated at one end to the chassis at a chassis connection zone and at the other end to the cabin at a cabin connection zone, the connecting element being arranged so as to raise at least the front of the cabin relative to the chassis while the cabin moves towards the front relative to the chassis in the event of an impact; and
   said at least one connecting element forming a rocker essentially comprising a component mounted astride the central strut and mounted on the central strut and either side of said strut by an articulation whose geometrical axis is essentially horizontal and perpendicular to the preferential rolling direction.

5. A vehicle according to claim 4, in which the geometrical axis of said articulation to the chassis is located at a first point and the articulation to the cabin is located at a second point, and in which, considering the first point representing the articulation to the cabin and the second point representing the articulation to the chassis in the vehicle's plane of symmetry, a straight line connecting the respective points passes above the center of gravity of the cabin.

6. A vehicle according to claim 3 or 4, in which the chassis extends towards the rear of the vehicle, and in which the rear portion of the cabin is mounted on the chassis by means for permitting the cabin to slide in the preferential rolling direction.

7. A vehicle according to claim 3 or 4, comprising a damper actuated by the relative movement between the cabin and the chassis.

8. A vehicle according to claim 7, in which said damper comprises a tubular reservoir filled with a viscous fluid in which a partition wall comprising at least one calibrated orifice can move, the damping resulting from the throttling effect when the viscous fluid is forced to flow from one side of the partition to the other, the partition being drawn within the reservoir by a cable, the cable and the reservoir being attached one to the cabin and the other to the chassis.

9. A vehicle having a preferential rolling direction over the ground and comprising:
   at the front, a chassis extending towards the front end of the vehicle where it comprises an impact zone;
   a cabin for the transport of passengers, the cabin being self-supporting and having a front edge, with said impact zone being remote from said front edge of the cabin;

a connection element forming a connecting bar articulated at one end to the chassis at a chassis connection zone and at the other end to the cabin at a cabin connection zone, the cabin connection zone being positioned at a level higher than and behind the chassis connection zone; and a pyrotechnic charge and shock detection means to trigger its ignition, the pyrotechnic charge assisting the raising of the cabin relative to the chassis.

10. A vehicle having a preferential rolling direction over the ground and comprising:

at the front, a chassis extending towards the front end of the vehicle where it comprises an impact zone;

a cabin for the transport of passengers, the cabin being self-supporting and having a front edge, with a certain protection formed between said impact zone and said front edge of the cabin;

a connection element forming a connecting bar articulated at one end to the chassis at a chassis connection zone and at the other end to the cabin at a cabin connection zone, the connecting element being arranged so as to raise at least the front of the cabin relative to the chassis while the cabin moves towards the front relative to the chassis in the event of an impact; and a pyrotechnic charge and shock detection means to trigger its ignition, the pyrotechnic charge assisting the raising of the cabin relative to the chassis.

11. A vehicle having a preferential rolling direction over the ground and comprising:

at the front, a chassis extending towards the front end of the vehicle where it comprises an impact zone;

a cabin for the transport of passengers, the cabin being self-supporting and having a front edge, with said impact zone being remote from said front edge of the cabin;

a connection element forming a connecting bar articulated at one end to the chassis at a chassis connection zone and at the other end to the cabin at a cabin connection zone, the cabin connection zone being positioned at a level higher than and behind the chassis connection zone;

the cabin being mounted on the chassis so as to allow a relative movement between the chassis and the cabin parallel to the preferential rolling direction in the event of impact; and the connecting element terminates on the cabin side in an end-stop mounted opposite a bearing surface located a short distance behind the end-stop, whereby the thrust exerted by the cabin in the event of an impact is transmitted to the end-stop.

12. A vehicle having a preferential rolling direction over the ground and comprising:

at the front, a chassis extending towards the front end of the vehicle where it comprises an impact zone;

a cabin for the transport of passengers, the cabin being self-supporting and having a front edge, with a certain protection formed between the said impact zone and the said front edge of the cabin;

a connection element forming a connecting bar articulated at one end to the chassis at a chassis connection zone and at the other end to the cabin at a cabin connection zone, the connecting element being arranged so as to raise at least the front of the cabin relative to the chassis while the cabin moves towards the front relative to the chassis in the event of an impact;

in which the cabin is mounted on the chassis so as to allow a relative movement between the chassis and the cabin parallel to the preferential rolling direction in the event of impact; and in which the connecting element terminates on the cabin side in an end-stop mounted opposite a bearing surface located a short distance behind the end-stop, whereby the thrust exerted by the cabin in the event of an impact is transmitted to the end-stop.

13. A vehicle having a preferential rolling direction over the ground and comprising:

at the front, a chassis extending towards the front end of the vehicle where it comprises an impact zone;

a cabin for the transport of passengers, the cabin being self-supporting and having a front edge, with said impact zone being remote from said front edge of the cabin;

a connection element forming a connecting bar articulated at one end to the chassis at a chassis connection zone and at the other end to the cabin at a cabin connection zone, the cabin connection zone being positioned at a level higher than and behind the chassis connection zone; and in which the cabin has a rear edge located further to the rear than the back end of the chassis.

14. A vehicle having a preferential rolling direction over the ground and comprising:

at the front, a chassis extending towards the front end of the vehicle where it comprises an impact zone;

a cabin for the transport of passengers, the cabin being self-supporting and having a front edge, with a certain protection formed between the said impact zone and the said front edge of the cabin;

a connection element forming a connecting bar articulated at one end to the chassis at a chassis connection zone and at the other end to the cabin at a cabin connection zone, the connecting element being arranged so as to raise at least the front of the cabin relative to the chassis while the cabin moves towards the front relative to the chassis in the event of an impact; and in which the cabin has a rear edge located further to the rear than the back end of the chassis.

* * * * *